(12) United States Patent
Candelore (10) Patent No.: US 8,712,057 B2
(45) Date of Patent: Apr. 29, 2014

(54) APPARATUS AND METHOD FOR AN ITERATIVE CRYPTOGRAPHIC BLOCK

(75) Inventor: Brant Candelore, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1193 days.

(21) Appl. No.: 12/053,343

(22) Filed: Mar. 21, 2008

(65) Prior Publication Data

US 2008/0170698 A1  Jul. 17, 2008

Related U.S. Application Data

(62) Division of application No. 10/801,962, filed on Mar. 15, 2004, now Pat. No. 7,366,302.

(60) Provisional application No. 60/497,690, filed on Aug. 25, 2003.

(51) Int. Cl.
*H04L 9/06* (2006.01)
*H04L 9/14* (2006.01)
*H04L 9/16* (2006.01)

(52) U.S. Cl.
USPC ............... 380/277; 380/42; 380/44; 380/45; 380/46; 380/47; 726/18; 726/19

(58) Field of Classification Search
USPC .......................................................... 380/277
See application file for complete search history.

(56) References Cited

U.S. PATENT DOCUMENTS

| | | | |
|---|---|---|---|
| 4,864,615 A * | 9/1989 | Bennett et al. | 380/239 |
| 5,063,596 A * | 11/1991 | Dyke | 713/192 |
| 5,533,123 A * | 7/1996 | Force et al. | 713/189 |
| 5,619,576 A | 4/1997 | Shaw | |
| 5,687,237 A * | 11/1997 | Naclerio | 380/29 |
| 5,751,811 A | 5/1998 | Magnotti et al. | |

(Continued)

FOREIGN PATENT DOCUMENTS

| | | |
|---|---|---|
| EP | 0 766 424 A2 | 4/1997 |
| WO | WO 97/05720 A | 2/1997 |

OTHER PUBLICATIONS

Maxim Integrated Products, Inc., 'DeepCover Security Manager for Tamper-Reactive Cryptographic-Node Control with AES Encryption Abridged Data Sheet MAX36025', Maxim Integrated Products, Inc., 2013, entire document, http://datasheets.maximintegrated.com/en/ds/MAX36025.pdf.*

(Continued)

*Primary Examiner* — Luu Pham
*Assistant Examiner* — Ronald Baum
(74) *Attorney, Agent, or Firm* — Blakely, Sokoloff, Taylor & Zafman LLP (57) ABSTRACT

A method and apparatus for an iterative cryptographic block under the control of a CPU and without a fixed number of stages. In one embodiment, a first cryptographic block descrambles received information using an internal key or a preprogrammed key to form a descrambled key or descrambled data. A data feedback path stores the descrambled data as internal data and provides the internal data or the external data as data input to the first cryptographic block. A key feedback path stores the descrambled key as an internal key and provides the internal key or the preprogrammed key to a key input of the first cryptographic block. A second cryptographic block descrambles received content using a final descrambling key. Other embodiments are described and claimed.

23 Claims, 10 Drawing Sheets

(56) References Cited

U.S. PATENT DOCUMENTS

| | | | |
|---|---|---|---|
| 5,825,879 | A | 10/1998 | Davis |
| 6,192,129 | B1 | 2/2001 | Coppersmith et al. |
| 6,307,936 | B1 | 10/2001 | Ober et al. |
| 6,333,983 | B1 | 12/2001 | Enichen et al. |
| 6,457,126 | B1 * | 9/2002 | Nakamura et al. ............ 713/166 |
| 6,560,337 | B1 * | 5/2003 | Peyravian et al. .............. 380/44 |
| 6,704,871 | B1 | 3/2004 | Kaplan et al. |
| 6,708,273 | B1 * | 3/2004 | Ober et al. ................... 713/189 |
| 7,005,733 | B2 * | 2/2006 | Kommerling et al. ........ 257/679 |
| 7,007,050 | B2 * | 2/2006 | Saarinen ....................... 708/250 |
| 7,055,029 | B2 * | 5/2006 | Collins et al. ................ 713/161 |
| 7,174,457 | B1 * | 2/2007 | England et al. ............... 713/168 |
| 7,242,772 | B1 | 7/2007 | Tehranchi |
| 2001/0018736 | A1 * | 8/2001 | Hashimoto et al. ............... 713/1 |
| 2003/0046563 | A1 * | 3/2003 | Ma et al. ....................... 713/190 |
| 2004/0039922 | A1 * | 2/2004 | Zaabab ......................... 713/189 |

OTHER PUBLICATIONS

Happich, J., 'FIPS-compliant secure processor IC integrates cryptographic acceleration instruction', UBM Tech, Oct. 15, 2013, entire document, http://www.edn.com/electronics-products/other/4422713/FIPS-compliant-secure-processor-IC-integrates-cryptographic-acceleration-instruction.*

* cited by examiner

APPARATUS AND METHOD FOR AN ITERATIVE CRYPTOGRAPHIC BLOCK

RELATED APPLICATION

This application is a divisional of U.S. patent application Ser. No. 10/801,962, filed Mar. 15, 2004, now U.S. Pat. No. 7,366,302 which claims the benefit of priority on U.S. Provisional Patent Application No. 60/497,690, filed Aug. 25, 2003.

FIELD OF THE INVENTION

One or more embodiments of the invention relate generally to the field of digital content security. More particularly, one or more of the embodiments of the invention relate to a method and apparatus for an iterative cryptographic block.

BACKGROUND OF THE INVENTION

Analog communication systems are rapidly giving way to their digital counterparts. Digital television is currently scheduled to be available nationally. High-definition television (HDTV) broadcasts have already begun in most major cities on a limited basis. Similarly, the explosive growth of the Internet and the World Wide Web have resulted in a correlative growth in the increase of downloadable audio-visual files, such as MP3-formatted audio files, as well as other content.

Simultaneously with, and in part due to this rapid move to digital communications system, there have been significant advances in digital recording devices. Digital versatile disk (DVD) recorders, digital VHS video cassette recorders (D-VHS VCR), CD-ROM recorders (e.g., CD-R and CD-RW), MP3 recording devices, and hard disk-based recording units are but merely representative of the digital recording devices that are capable of producing high quality recordings and copies thereof, without the generational degradation (i.e., increased degradation between successive copies) known in the analog counterparts. The combination of movement towards digital communication systems and digital recording devices poses a concern to content providers such as the motion picture and music industries, who are reluctant to provide downloadable digital content due to fears of unauthorized and uncontrolled copying of such digital content.

In response, there is a movement to require service providers, such as terrestrial broadcast, cable and direct broadcast satellite (DBS) companies, and companies having Internet sites which provide downloadable content, to introduce copy protection schemes. These copy protection schemes may extend beyond the role of conditional access (CA), merely descrambling content to a CA-clear format for real-time viewing and/or listening, and now include constraints and conditions on the recording and playback. For example, currently, copying of scrambled content for subsequent descrambling and viewing or listening may be permitted with the appropriate service/content provider authorization or key provided to the digital device.

Traditional CA systems for Pay-TV originated from one-way broadcast systems where a back channel was not available. A cryptographic processor, such as a smart card, in a conditional access unit (e.g., a set-top box) is generally infused with information and functionality in order to automatically grant access to programs. For example, a smart card with a Pay-TV access control application is adapted to receive messages that grant certain service entitlements. If the set-top box was allowed to view IPPV programs, then credit and cost limit information was transmitted as well. Likewise, when tuning to a program, the smart card received messages that described which entitlements the smart card needed in order to grant access to the program.

Currently, hackers have manipulated both types of messages in order to view programs without paying the requisite subscription fees. Not only can these messages be manipulated, but the hardware can be attacked as well. For instance, descrambling keys in the clear that are used to descramble scrambled content can be copied and sent to other set-top boxes over the Internet. Such hacking is costly to both service providers as well as the content owners.

BRIEF DESCRIPTION OF THE DRAWINGS

The various embodiments of the present invention are illustrated by way of example, and not by way of limitation, in the figures of the accompanying drawings and in which.

DETAILED DESCRIPTION

A method and apparatus for an iterative cryptographic block are described. Various embodiments relate to an apparatus, system and method for protecting the transfer of data. In one embodiment, such protection involves the descrambling and/or decrypting of digital content from one or more service providers within the digital devices themselves. Examples of a "service provider" include, but are not limited to a terrestrial broadcaster, cable operator, direct broadcast satellite (DBS) company, a company providing content for download via the Internet, or any similar sources of content.

In the following description, certain terminology is used to describe features of the invention. For instance, the terms "component" or "logic" are each representative of hardware and/or software configured to perform one or more functions. Examples of "hardware" include, but are not limited or restricted to an integrated circuit such as a processor (e.g., microprocessor, application specific integrated circuit, a digital signal processor, a micro-controller, etc.), finite state machine, combinatorial logic or the like. The term "process block" represents hardware and/or software having a dedicated function, such as a finite state machine for example.

An example of "software" includes a series of executable instructions in the form of an application, an applet, or even a routine. The software may be stored in any type of machine readable medium such as a programmable electronic circuit, a semiconductor memory device such as volatile memory (e.g., random access memory, etc.) and/or non-volatile memory (e.g., any type of read-only memory "ROM", flash memory), a floppy diskette, an optical disk (e.g., compact disk or digital video disc "DVD"), a hard drive disk, tape, or the like.

System

Figure 1:
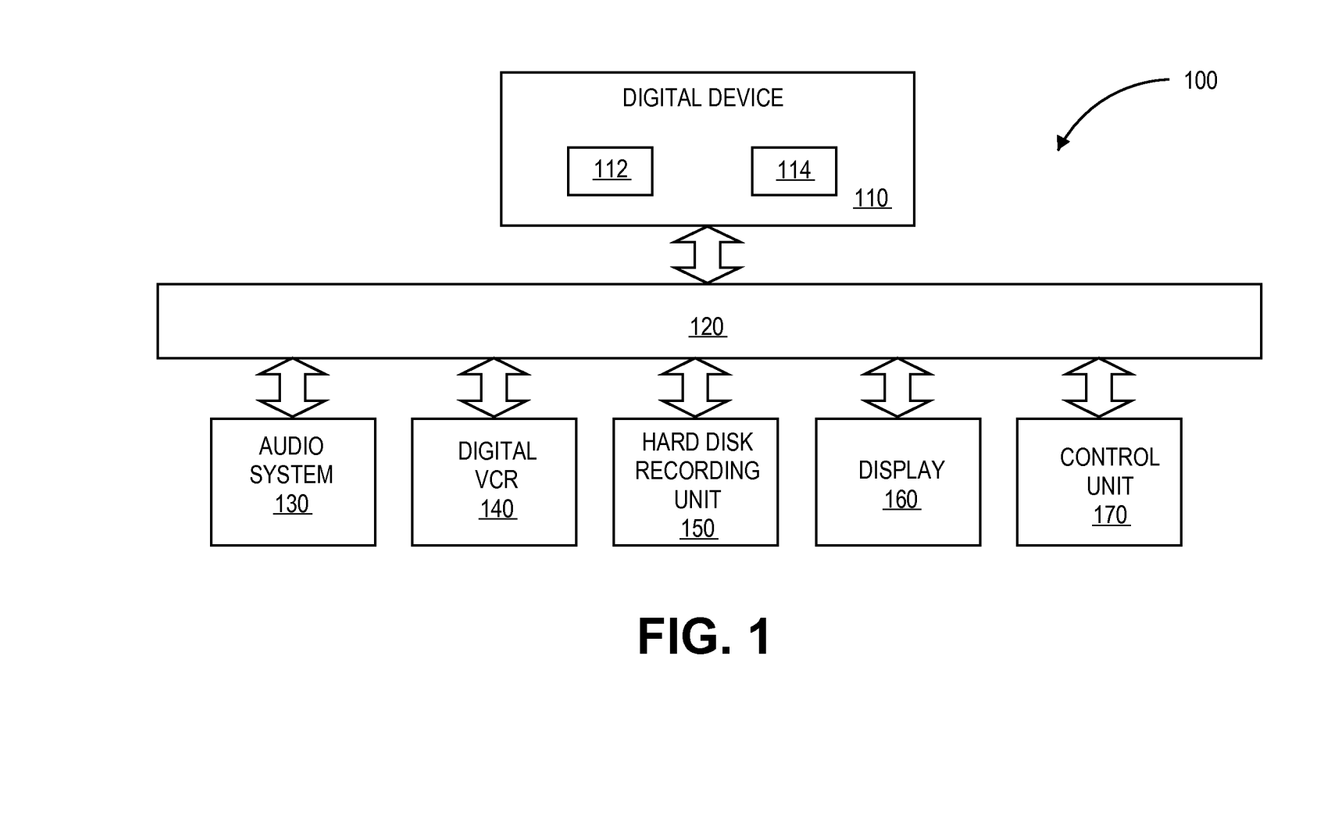
FIG. 1 is a block diagram of a content delivery system including a digital device, in accordance with one embodiment.

Referring to FIG. 1, one embodiment of a content delivery system 100 is shown. Content delivery system 100 includes a digital device 110 that receives information including program data from one or more service providers. The program data may be propagated as a digital bit stream for example. Digital device 110 may operate as any number of products such as a set-top box or one or more components integrated into a television, computer, audio-playback device (e.g., digital radio), audio-recording device (e.g., MP3 player), video-recording device (e.g., digital recorder), or the like.

For instance, digital device 110 may be configured in accordance with an embedded architecture, a split security architecture, or other like architecture. As an embedded architecture, in one embodiment, digital device 110 is implemented as a set-top box that comprises fixed, internal circuitry supporting both entitlement management and descrambling operations. Alternatively, in accordance with a split security architecture embodiment, digital device 110 may be adapted to receive a removable smart card that handles entitlement management, while descrambling of digital content is controlled by internal circuitry.

Digital device 110 comprises a receiver 112, which processes the incoming information, extracts the program data inclusive of the digital content therefrom, and provides the digital content in a perceivable format (e.g., viewable and/or audible). The "program data" comprises any or all of the following: system information, entitlement control message(s), entitlement management message(s), or digital content. The "digital content" in the program data stream may include an image, audio, video or any combination thereof. The content may be in a scrambled or clear format.

As described herein, the term "scrambled", when used to modify the terms "key", "content", "format" or "form" is inclusive of content or describes a format wherein encryption using any known encryption algorithm including, but not limited, the date encryption standard (DES), triple DES (3DES), advanced encryption standard (AES) Rivest, Shamir and Adelman (RSA) encryption or other like encryption standard, as well as scrambling algorithms, including conditional access (CA) common scrambling algorithm (CSA) (CA CSA) or other like scrambling algorithm. Likewise, the terms "scrambling" or "scrambled" refer to data or information that is encrypted or scrambled using any known conventional encryption or scrambling algorithms, as described above. The terms "descrambled" or "descrambling", when modifying the terms "key", "content" "format" or "form" refers to data or content in a format that is either decrypted or descrambled, such that the data or content is unobscured and available for playback in the clear format.

Herein, "system information" may include information on program names, time of broadcast, source, and a method of retrieval and decoding, and well as copy management commands that provide digital receivers and other devices with information that will control how and when the digital content may be replayed, retransmitted and/or recorded. These copy management commands may also be transmitted along with an entitlement control message (ECM), which is generally used to regulate access to a particular channel or service. An "Entitlement Management Message" (EMM) may be used to deliver entitlements (sometimes referred to as "privileges") to digital receiver 111. Examples of certain entitlements may include, but are not limited to access rights or descrambling keys. A descrambling key is generally a code that is required by descrambler (decryption) logic (e.g., a cryptographic block) to recover data in the clear from a scrambled format based on the entitlements granted.

As shown, when implemented as a set-top box, digital device 110 may be coupled to other components in content delivery system 100 via a transmission medium 120. The transmission medium 120 operates to transmit program data between digital device 110 and other components in content delivery system 100. The transmission medium 120 may include, but is not limited to electrical wires, optical fiber, cable, a wireless link established by wireless signaling circuitry, or the like.

In one embodiment, content delivery system 100 includes an audio system 130 coupled to transmission medium 120. A digital VCR 140, such as a D-VHS VCR, may also be coupled to the digital device 110 and other components of content delivery system 100 through transmission medium 120. A hard disk recording unit 150 may also be coupled to digital device 110 and other components via transmission medium 120. Display 160 may include a high definition television display, a monitor, or another device capable of processing digital video signals. Finally, a control unit 170 may be coupled to the transmission medium 120. Control unit 170 may be used to coordinate and control the operation of some or each of the components on content delivery system 100.

The digital content of the program data may be transmitted in scrambled form. In one embodiment, as part of the program data, access requirements may be transmitted along with the scrambled content to digital device 110 (e.g., set-top box) that is implemented with receiver 112 thereby functioning as a conditional access unit. An "access requirement" is a restrictive parameter used to determine if digital device 110 implemented with conditional access functionality, hereinafter referred to herein as the "conditional access unit 110," is authorized to descramble the scrambled content for viewing or listening purposes. For example, the access requirement may be a key needed to perceive (view and/or listen to) the content, a service tag associated with a given service provider, or even a particular descrambling software code.

When a scrambled program is received by conditional access unit 110, the access requirements for the program are compared to the actual entitlements assigned to the conditional access unit 110. In order for the conditional access unit 110 to display the scrambled content in clear form, in one embodiment, the access requirements associated with the digital content are compared to the entitlements of the conditional access unit 110. The entitlements may state that conditional access unit 110 is entitled to view/playback content from a given content provider such as Home Box Office (HBO), for example. The entitlements may also include one or more keys needed to descramble the digital content. The entitlements also may define the time periods for which conditional access unit 110 may descramble the digital content.

Thus, in one embodiment, access requirements and entitlements form a part of the access control system to determine whether a conditional access unit or even a decoder is authorized to view a particular program. It is contemplated that the description below focuses on mechanisms to recover audio/visual content such as television broadcasts, purchased movies and the like. However, it is contemplated that the invention is also applicable to the descrambling of audible content only (e.g., digitized music files).

The access requirements and entitlements can provide consumers with a variety of choices for paying for the content and gaining access to the scrambled content. These choices may include pay per play (PPP), pay per view (PPV), impulse pay per view (IPPV), time based historical, pay per time (PPT). "Impulse pay per view" is a feature which allows purchase of PPV movies through credit that has been previously downloaded into the set-top box. Purchase records may be stored and forwarded by phone to a billing center. "Time based historical" allows access to content that was delivered during a past time period, such as March through December, 2003, for example. The access requirements and entitlements can also provide consumers with different options for storing the scrambled content.

The access requirements may be delivered to the conditional access unit, located within digital device 110 or coupled thereto over transmission medium 120, using packet identifiers (PIDs). Each PID may contain the access requirements associated with a given service. The content that is delivered to the conditional access unit may also include a large number of PIDs, thus enabling special revenue features, technical features, or other special features to be performed locally.

Before receiving the content, the customer may be given a number of choices for gaining access to the digital content that is going to be stored to media. The customer may be required to purchase the right to access and view the content. Therefore, if the customer wants to record the content for later retrieval and viewing, the access requirements that the customer bought also need to be stored with the digital content.

Figure 2:
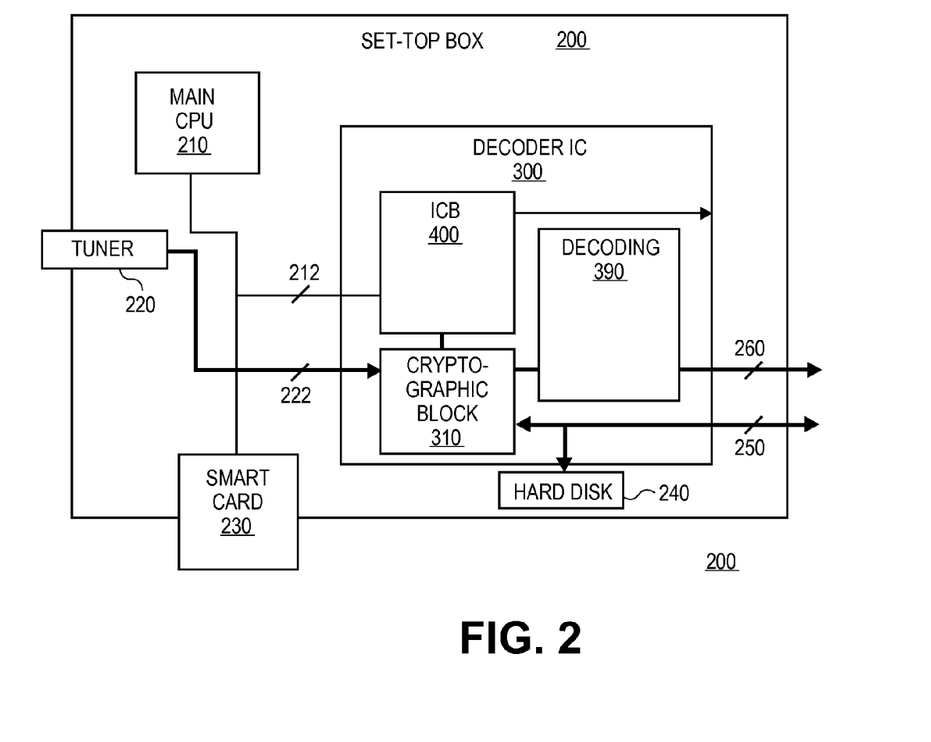
FIG. 2 is a block diagram illustrating a set-top box including an iterative cryptographic block, in accordance with one embodiment.

In addition, there may be copy-protection applied to the descrambled digital content (e.g., transport stream) as shown in FIG. 2. Copy-protected digital content will be re-scrambled across an interface interconnecting a destination interface and a source. The source and destination interface need to agree on the key used to re-encrypt this content. This copy protection key can be encrypted with the unique key associated with the digital device. The unique key can be received through an EMM or other method, e.g. factory load procedure.

FIG. 2 is a block diagram illustrating a secure content delivery system that comprises a conditional access unit as a set-top box 200 adapted to operate with an iterative cryptographic block (ICB) 400, in accordance with one embodiment. As illustrated, decoder integrated circuit (IC) 300 receives scrambled content 222 from tuner 220 that is descrambled using cryptographic block 310. In one embodiment, depending on the encoding of the scrambled content, once descrambled, the content is decoded using decode block 390 to form a clear content signal, such as, for example, a video output signal 260.

However, the embodiments described herein are not limited to incorporation of ICB 400 within decoder IC 300, which decodes descrambled content to form clear content. In one embodiment, ICB 400 may be used within a cryptographic IC in order to reduce the cost of the cryptographic IC by removing additional blocks required to perform key ladder applications, such as key an data nesting, as described herein. In alternate embodiments, ICB 400 may be used within or performed by programmed cryptographic processors or cryptographic ICs or operate under the control of a state machine.

In one embodiment, an embedded cryptographic CPU is programmed to perform the functionality of ICB 400. Accordingly, in one embodiment, ICB 400 is an embedded cryptographic CPU configured to perform multiple scrambling of digital content and to implement key ladder applications of descrambling keys and data nesting used to form a final descrambling key which may be used to clear digital content. Furthermore, in one embodiment, ICB 400 may be used within a mating key server to generate known vectors into a key processing block in a receiver with a one-time programmable key to encrypt service keys and derivative keys to decrypt content.

In the embodiment illustrated, clear digital output 250 may be scrambled and stored within hard disk 240 to prohibit clear unauthorized exposure of the digital content. In one embodiment, ICB 400 of decoder IC 300 stores at least one one-time programmable (OTP) secret key that enables the performance of key ladder decryption schemes in order to enable low cost converter set-top boxes, which will be required as cable operators convert their plants to all digital configurations. In one embodiment, an optional smart card 230 handles entitlement management, while descrambling of digital content is controlled by ICB 400.

Representatively, smart card 230 stores one or more encrypted descrambling keys for descrambling incoming digital content. Smart card 230 transmits the descrambling key(s) in encrypted form to ICB 400. In order to protect the descrambling key(s), generally referred to as "DK", from being improperly extracted by an interloper monitoring communications between smart card 230 and ICB 400, smart card 230 may use an encryption key unique to decoder IC to encrypt the DK. This allows decoder IC to decrypt the DK in a secure manner and use the DK in a clear format to descramble digital content 22.

In one embodiment, each stage of ICB 400 is controlled by main central processing unit (CPU) 210. In one embodiment, CPU 210 selects the internal (secret) key and the data (internal or external) inputs and the modes of operation provided by ICB 400. As discussed in further detail below, each processing step provided by ICB 400 allows secure operation through a solitary cryptographic block designed with key and data feedback paths, hashing and chaining modes and anti-hack circuits, as further illustrated with reference to FIG. 3.

In one embodiment, descrambler IC 300 handles the secure processing of the descrambling keys. This descrambler IC 300 has no CPU, no firmware, and no software. However, by using a key feedback path, complicated key hierarchy are supported by ICB 400. No instructions, no code, and no software is loaded into ICB 400. The decryption scrambled key is performed entirely by ICB 400 being a hardware circuit or state machine using only a single key function.

One or more unique keys, generally referred to herein as "one-time programmable (OTP) key(s))", may be programmed into a storage element such as, one or more key registers 250 during manufacture. For example, in one embodiment, decoder IC 300 is implemented with a programmable non-volatile storage element (not shown), such as flash. In another embodiment, decoder IC 300 is implemented with non-programmable, non-volatile memory that can be written only once in order to enhance security. As a result, there is no way to either improperly read or overwrite the OTP that is originally loaded into a storage element. An association between the serial number of set-top box 200 and the OTP loaded into decoder IC 300 of the set-top box 200 may be recorded.

When set-top box 200 is manufactured and a smart card 230 is installed, smart card 230 can receive the OTP associated with set-top box 200 at the time of pairing. From then on, smart card 230 is "paired" to that particular host (e.g., set-top box 200). Later, if smart card 230 is ever replaced or moved to a new host, smart card 230 may be adapted to receive a unique key associated with the new host via an Entitlement Management Message (EMM), Of course, as an alternative, a new smart card with a newly programmed unique key may also be delivered to the user.

As illustrated with reference to FIG. 3, ICB 400 includes a key feedback path 402, as well as the data feedback path 404, which enable the implementation of virtually any type of key hierarchy. As described in further detail below, iterative looping on the key and data allows the implementation of relatively complicated nested key and data hierarchies (where internally stored values are used to process subsequent values ad naseum). Accordingly, in one embodiment, decoder IC 300, with the use of ICB 400, may provide support for conditional access (CA) and digital rights management (DRM) methods where players in delivery systems can be authenticated into a root key or content key derived. As further illustrated in detail below, ICB 400 supports not only data block decryption, but also encryption/decryption of streams. In one embodiment, anti-hack circuits have been added to prevent manipulation of an implementation's key hierarchy by the inherently flexible design of ICB 400.

In one embodiment, a scrambled (encrypted) descrambling (decryption) key from, for example, smart card 230, may be provided to external data input 422 of ICB 400. In one embodiment, the scrambled key is descrambled by cryptographic block 410 using an OTP key from OTP key registers 472. In one embodiment, the descrambled key is directly provided to content key processing 320 and used to directly descramble scrambled content 222. In another embodiment, the descrambled key is used to descramble one or more descrambling keys, which are received inband with scrambled content 222, and subsequently used for descrambling purposes.

Representatively, descrambled key 468 is stored within internal key registers 470 and subsequently used to descramble scrambled keys received inband via external data input 422. Each received descrambled key may be scrambled using different public and proprietary encryption, scrambling or other like algorithms. These different proprietary algorithms may be considered as anti-piracy measures to invalidate clone hardware. Furthermore, in one embodiment, scrambled system information, such as, for example, copy management commands transmitted along with entitlement control messages (ECM) to regulate access to a particular channel service, as well as entitlement management messages (EMM), which may be used to deliver entitlements or privileges, may be descrambled, or decrypted, via cryptographic block 410 and stored in clear format in external data out 270.

Figure 4:
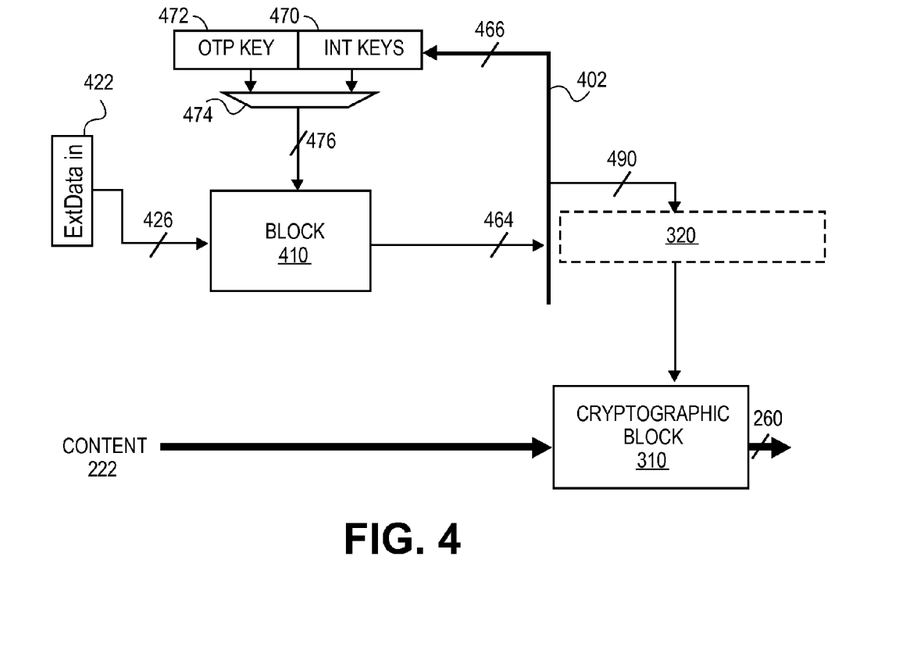
FIG. 4 is a block diagram illustrating a key feedback path of the iterative cryptographic block of FIG. 3, in accordance with one embodiment.

FIG. 4 is a block diagram further illustrating key feedback path 402 of ICB 400, in accordance with one embodiment. In one embodiment, key feedback path 402 operates under the control of an off-chip, insecure CPU, such as, for example, CPU 210. As illustrated, external data input 422 receives scrambled external information 426, which is provided to cryptographic block 410. In one embodiment, the block 410 may be implemented using the advanced encryption standard (AES), triple data encryption standard (3DES), a digital video broadcast (DVB) common scrambling algorithm (CSA) (DVB CSA), a data encryption standard (DES) or the like.

Representatively, external information 426 may include a scrambled key, which is provided in band with scrambled content 222. In the embodiment illustrated, at least one preprogrammed key, such as, for example, an OTP key is stored within key register 472. Representatively, when an inband scrambled key 426 is received by block 410, key selection gate 474 provides descrambling key 476 to a key input of block 410. Using descrambling key 476, the received inband scrambled key is descrambled to form internal key 464.

According to conventional techniques, internal key 464 may be provided to cryptographic block 310 in order to decrypt scrambled content 222. However, in one embodiment, ICB 400 includes key feedback path 402, which enables the storage of descrambled internal keys 466 within internal key register 470. Hence, in the embodiment illustrated, iterative key looping may be performed by storing internal keys 466 within internal key registers 470 to descramble in band received encrypted keys.

Figure 5:
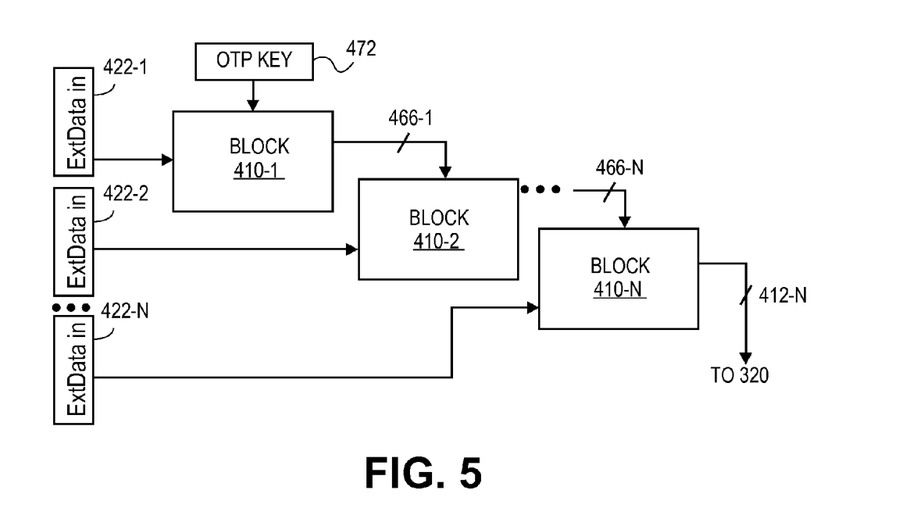
FIG. 5 is a block diagram illustrating key nesting using the iterative cryptographic block of FIG. 3, in accordance with one embodiment.

Accordingly, as illustrated with reference to FIG. 5, a key ladder (also referred to herein as key nesting) may be performed as inband scrambled keys are descrambled to form internal keys 466, which are then used to descramble a further inband key 466 (466-1, . . . , 466-N) to form a final descrambling key 412-N, which is sent to content key processing 320. In contrast to conventional key nesting, or key ladders, which require multiple cryptographic blocks to implement such key ladders, ICB 400, using key feedback path 402, may provide infinite key ladders in order to provide a final descrambling key while using a single cryptographic block.

Accordingly, as illustrated with reference to FIG. 4, ICB 400 allows for internal key feedback registers 470 and 472, which allow infinite iteration or looping on the key value using, for example, an AES core cipher for decryption block 410. Representatively, feedback registers 470 allow an infinite amount of key depth without using an infinite amount of cryptographic blocks. Although some CA units allow iteration around a descrambling core, the number of iterations are fixed. A fixed number of iterations makes it difficult to accommodate different key management approaches and key hierarchies. In one embodiment, AES is used since a key size of AES matches a key size of the data encryption block.

Hence, AES experiences no information loses as experienced with DES when a 64-bit output is used for the 56-bit key of the next processing stage wherein 8 bits of data are lost in a process called sparsing. Representatively, with each processing stage, external information 426 (426-1, . . . , 426-N)

may be decrypted by any of the internal keys (OTP or internally stored keys). In one embodiment, internal key registers 470 can also be used to temporarily store decrypted keys for packages, channels or programs to allow for more rapid channel tuning and descrambling of a stream.

Figure 6:
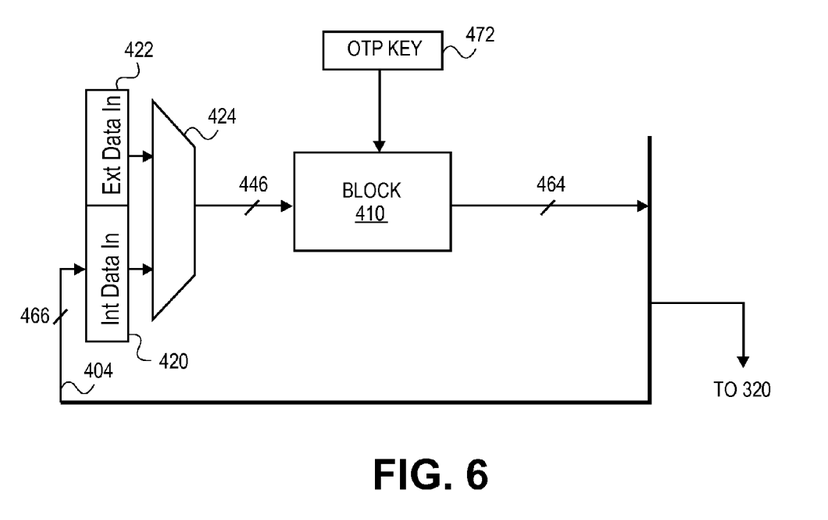
FIG. 6 is a block diagram illustrating a data feedback path of the iterative cryptographic block of FIG. 3, in accordance with one embodiment.
Figure 7:
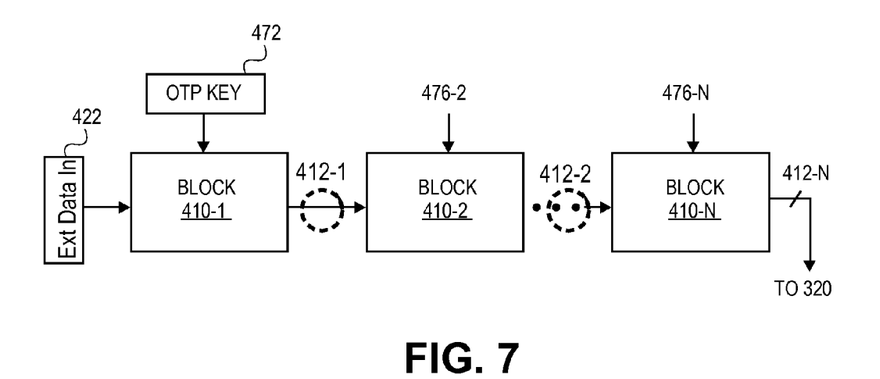
FIG. 7 is a block diagram illustrating data nesting using the iterative cryptographic block of FIG. 3, in accordance with one embodiment.

Referring now to FIG. 6, data feedback path 404 of ICB 400 is further illustrated, in accordance with one embodiment. In one embodiment, data feedback path operates under the control of an off-chip, insecure CPU. As illustrated, internal data register 420 is used to store descrambled data 466 from a previous stage. Accordingly, as illustrated with reference to FIG. 7, data nesting may be performed using preprogrammed key 476 by storing decrypted data 466 from a previous stage with an internal data register 420. Accordingly, internal data feedback register 420 allows infinite iterative looping on data value of decrypted data values 412 (412-1, . . . , 412-N). Accordingly, inband received descrambling keys may be encrypted multiple times in order to enhance security features provided by decoder IC 300.

Figure 8:
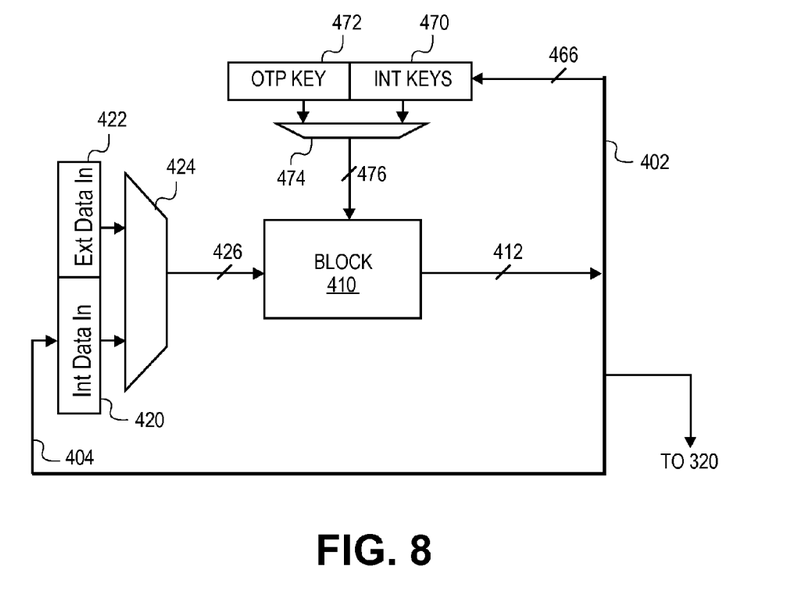
FIG. 8 is a block diagram illustrating a combination of the key feedback path and data feedback path of the iterative cryptographic block of FIG. 3, in accordance with one embodiment.
Figure 9:
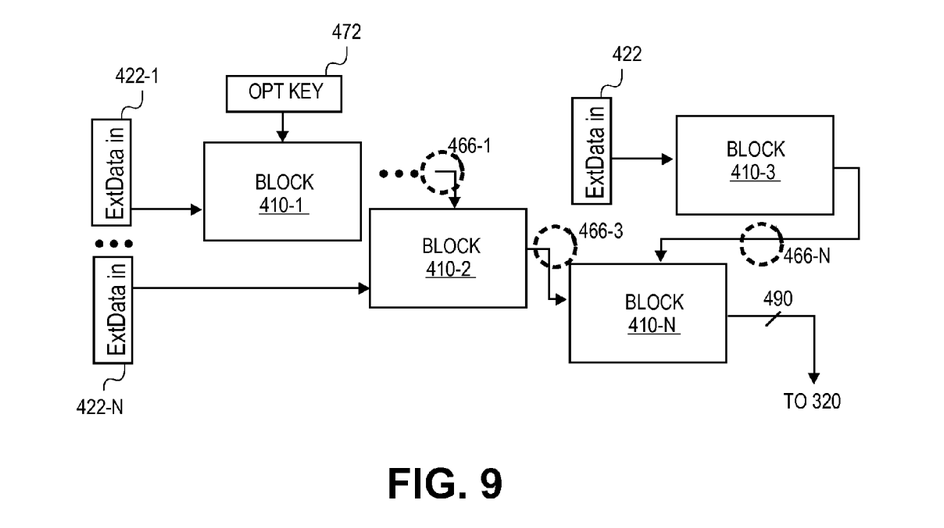
FIG. 9 is a block diagram illustrating key and data nesting using the iterative cryptographic block of FIG. 3, in accordance with one embodiment.

Furthermore, as illustrated with reference to FIG. 8, FIG. 8 further illustrates key feedback path 402 and data feedback path 404, which enable ICB 400 to provide a combination of iterative key and data looping. Representatively, ICB 400 uses both internal key 470 and data feedback registers 420, which allow the looping on the basic AES block cipher 410. In one embodiment, the key and data looping can allow for secure processing of powerful key tree ladders. As known to those skilled in the art, a key tree ladder represents the key/data processing required to derive a content key which is used to descramble content.

As described herein, the key ladder can be a hash of data representing the access criteria for one or more content players or groups of players. The tree ladder can an efficient way for a player to process the key because the player does not necessarily need to receive all the data from all the branches of the tree. The resulting key or hash of the data from a particular branch of the tree can be delivered to the player. The resulting root key can be a function of all of the data from all the branches thereby providing a type of authentication of all of the data. In one embodiment, the combination of key and data nesting enables mapping of most CA and DRM systems to a combination key and data functionality provided by ICB 400.

Figure 10:
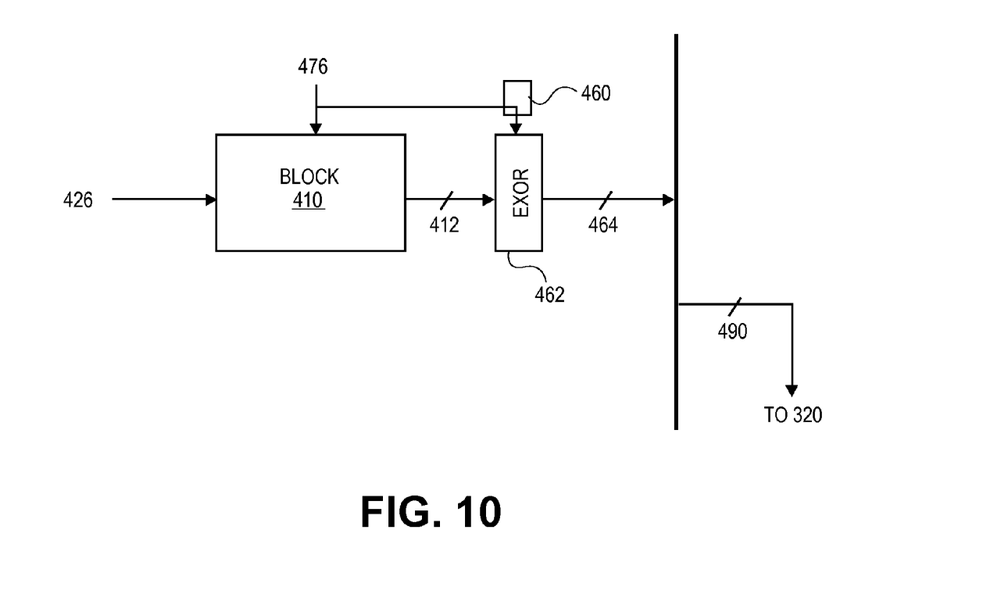
FIG. 10 is a block diagram illustrating a feed forward hash of a key using the iterative cryptographic block of FIG. 3, in accordance with one embodiment.
Figure 11:
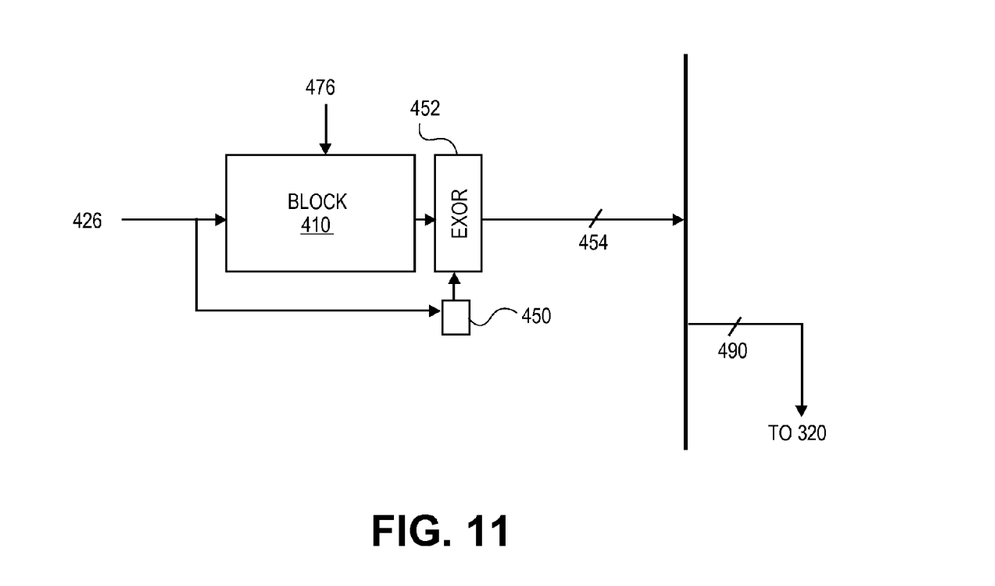
FIG. 11 is a block diagram illustrating a feed forward hash of data using the iterative cryptographic block of FIG. 3, in accordance with one embodiment.

Referring now to FIGS. 10 and 11, embodiments of hashing and chaining modes of ICB 400 are illustrated. As illustrated with reference to FIG. 10, logic gate enable 460 is coupled to a key input of block 410 and logic gate 462. In one embodiment, logic gate 462 performs a logical exclusive (XOR) operation from a descrambling key from the key input of decrypt block 410 and a descrambled key 412 to form hash key value 464. Hence, in one embodiment, by providing hash key value 464, a final descrambling key produced by ICB 400, if accessed by a hacker, would be provided in a hashed configuration, which would be useless to the hacker.

As illustrated with reference to FIG. 11, ICB 400 may be implemented to provide feed forward hashing of data. Representatively, gate enable logic 450 receives scrambled data 426 and provides its value to logic gate 452, which performs a logical exclusive OR (XOR) operation of the descrambled data 412 and the scrambled external information 426 to perform hash data value 454. Accordingly, if a final key value produced by ICB 400 is accessed by a hacker, the received key value is a hashed value, which is of no use to a hacker, thereby ensuring the security provided by ICB 400.

Figure 12:
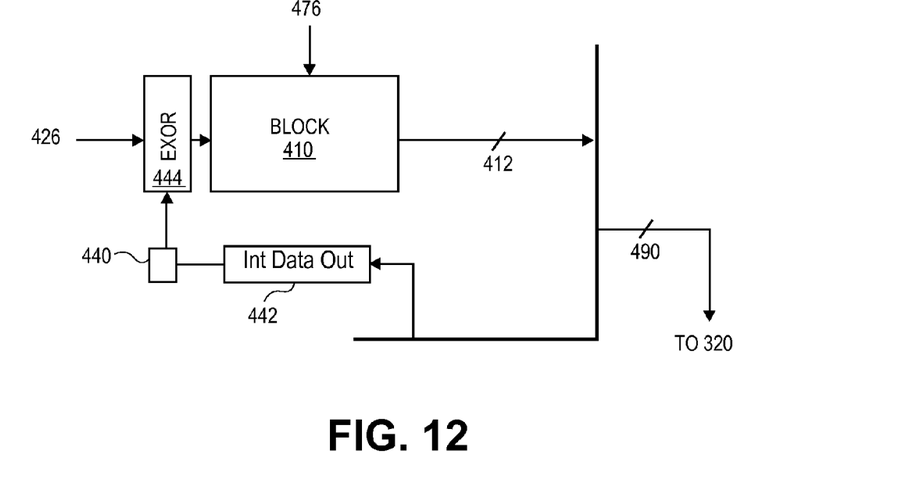
FIG. 12 is a block diagram illustrating cipher block chaining using the iterative cryptographic of FIG. 3, in accordance with one embodiment.

Referring to FIG. 12, an embodiment of a cipher block chaining mode embodiment of ICB 400 is illustrated. Representatively, internal data output register 442 may be used to store, for example, an initialization vector (IV), which is provided to gate enable logic 440. The IV may be provided to logic gate 444 to perform an XOR operation of external information 426 that is decrypted with block 410. As known to those skilled in the art, cipher block chaining (CBC) is a confidential mode whose encryption features the combining (chaining) of the plain text blocks with previous cipher blocks.

Hence, as illustrated with reference to FIG. 12, internal data output 440 initially stores initialization vectors (IVs) and subsequently decoded cipher text from a previous block. Accordingly, CBC mode requires an IV to combine with the first plain text block. The IV need not be secret, but is generally required to be unpredictable. Accordingly, for security reasons, block 410 is limited to simply performing decryption operations. Accordingly, hackers cannot be given the ability to encrypt internal key values, which would potentially allow them to gain access to services for which they are not entitled.

Figure 13:
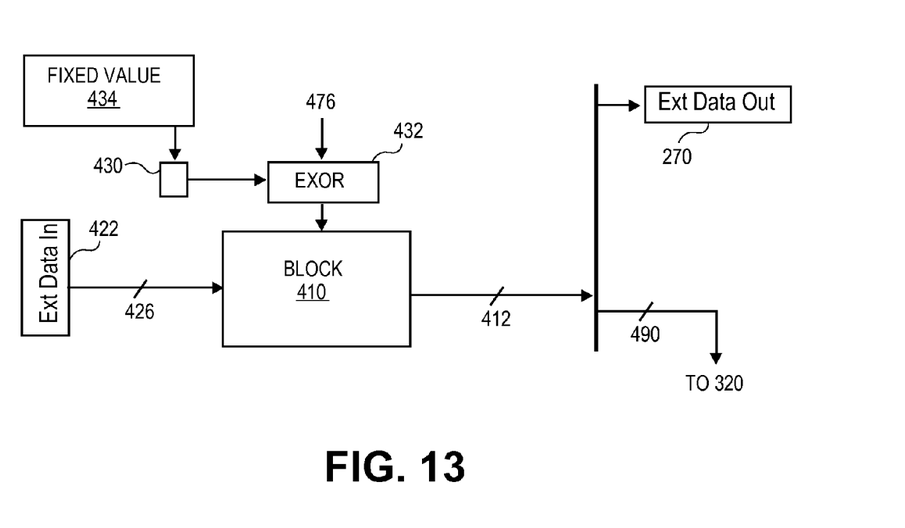
FIG. 13 is a block diagram illustrating an anti-hack circuit embodiment of the iterative cryptographic block of FIG. 3, in accordance with one embodiment.

Referring now to FIG. 13, an embodiment for implementing anti-hack output registers of ICB 400 is illustrated. According to this embodiment, decoder IC 300 (FIG. 2) includes external data output 270 and content key output (not shown). In one embodiment, ICB 400 is configured to permute a final key value, which generates data sent to external data output 270. In one embodiment, the calculated key sent to content key output is permuted. Representatively, these permutations make the processing of the last stage, whether for data or key, orthogonal to process done anywhere else.

Hence, the possibility that key processing can be hacked is reduced, while still providing completely flexible key and data ladder configurations. In one embodiment, external data output 270 allows CPU 210 (FIG. 2) to decrypt messages and content files. However, a security problem exists with non-fixed key ladders in that a hacker might redirect an internal key or data to external data output register 270. Unfortunately, the key delivered to this register would be correct and in the clear. Hence, in one embodiment, external data output 270 uses a permuted key to prohibit internal keys and data from being revealed when written to external data output 270.

Figure 3:
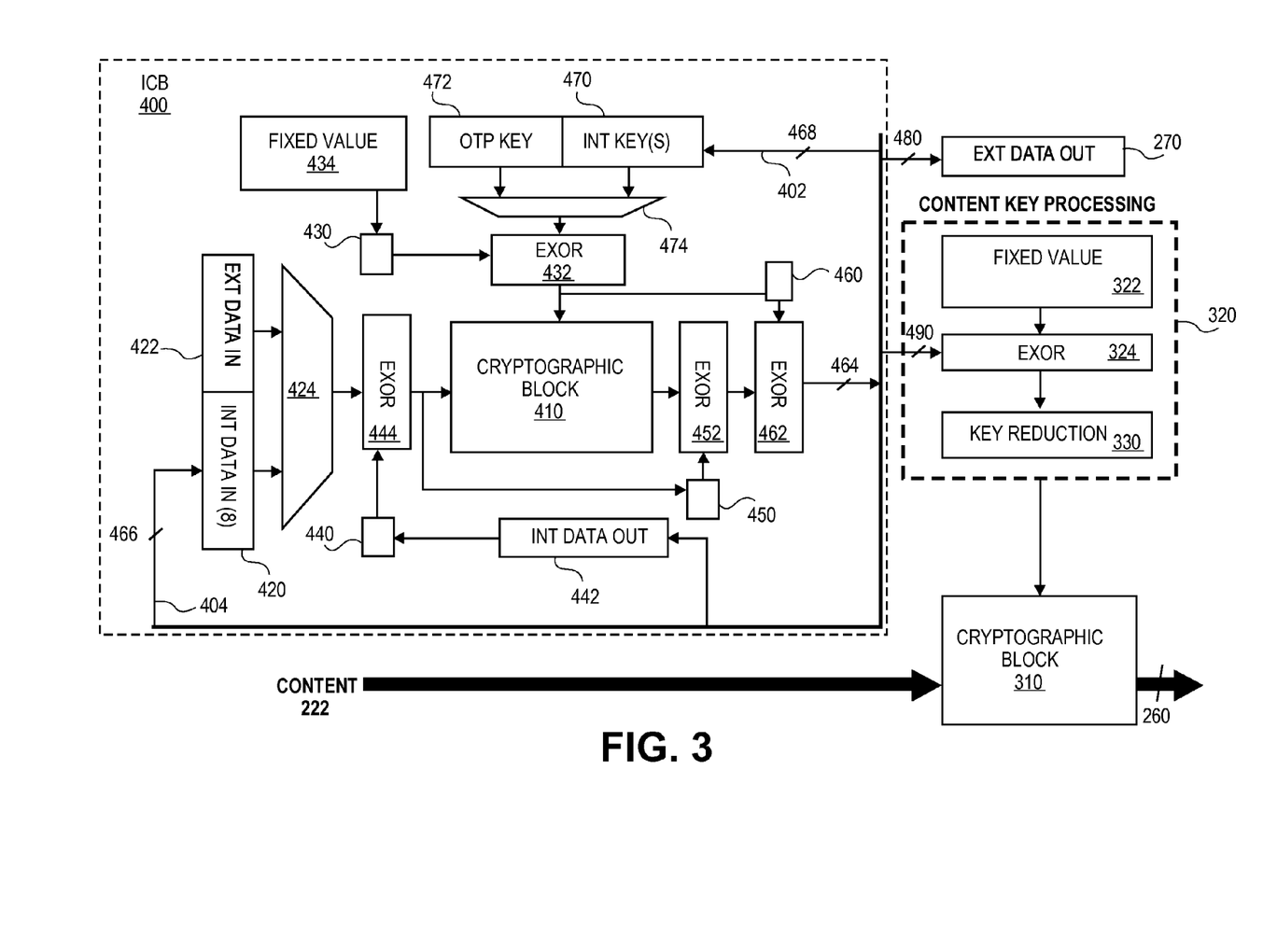
FIG. 3 is a block diagram further illustrating the iterative cryptographic block of FIG. 2, in accordance with one embodiment.
Figure 14:
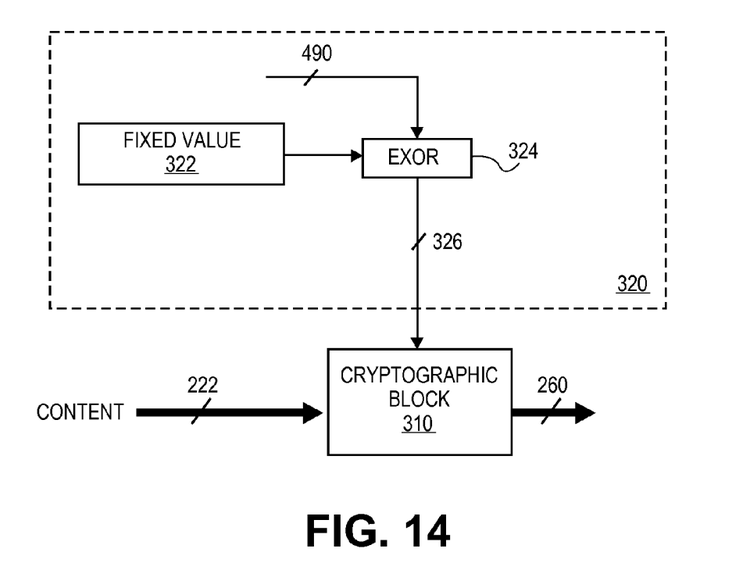
FIG. 14 is a block diagram further illustrating an anti-hack circuit embodiment for content key processing, in accordance with one embodiment.

Referring now to FIG. 14, an embodiment of content key processing 320 of FIG. 3 is illustrated. In one embodiment, ICB 400 sends data to key decryption registers, which get matched to decrypt or encrypt selected packet identifiers. Representatively, decryption logic then writes the decrypted descrambling keys into odd and even key storage elements for decryption by cryptographic block 310. However, a security problem exists with non-fixed key ladders in that a hacker might redirect an internal key or data to the content key output register (the key delivered to this register would be correct). Hence, a hacker could trial this key or use the key to encrypt or decrypt data, such as, data sent as MPEG packets. Accordingly, in one embodiment, external data output 270 uses a permuted key 326 to prohibit manipulation of the content key register.

In one embodiment, ICB 400 can support key deliveries to the following low level encryption algorithms, including but not limited to AES (128-bits), 3DES (112-bits), CSA (64-bits) and DES (56-bits) or the like. Conventionally, a security problem exists with systems that allow different bit level content descrambling algorithms. A hacker may program the device to chose 56-bit DES instead of 128-bit AES in order to trial the DES key. As a result, key reduction algorithms for reducing 128-bit to 56-bit key sizes (and other values for different descrambling algorithms) could potentially lead to a key exposure problem if performed incorrectly. Generally, smaller keys are much more easily trialed than longer keys. Once the smaller keys are known, the hacker could trial for other bits in the longer key.

Figure 15:
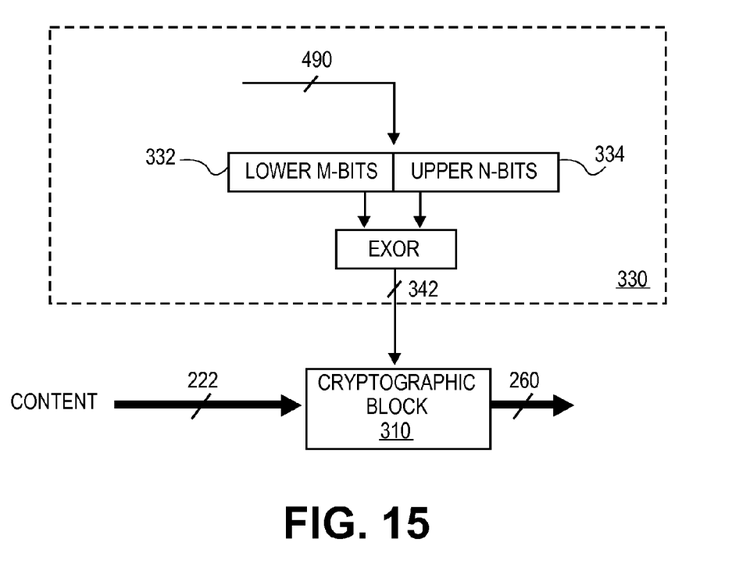
FIG. 15 is a block diagram illustrating key reduction logic of a decryption key formed from the iterative cryptographic block of FIG. 3, in accordance with one embodiment.
Figure 16:
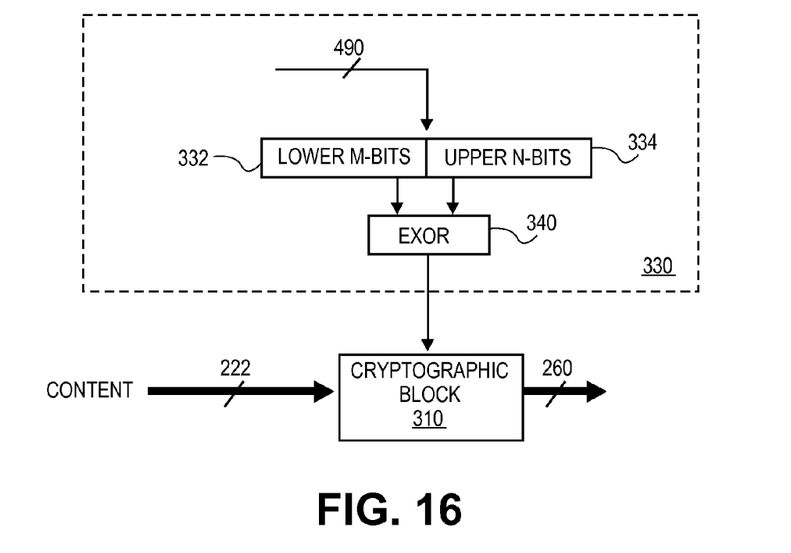
FIG. 16 is a block diagram illustrating key reduction logic decryption key formed from the iterative cryptographic block of FIG. 3, in accordance with one embodiment.
Figure 17:
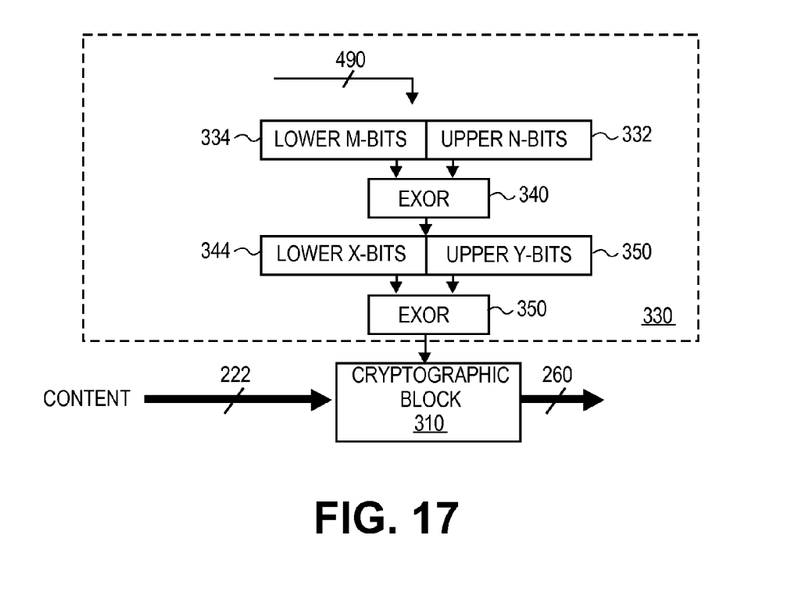
FIG. 17 is a block diagram illustrating key reduction logic decryption key formed from the iterative cryptographic block of FIG. 3, in accordance with one embodiment.

Accordingly, in one embodiment, key reduction logic 330 provides a method which XORs all bits together to create a reduced bit key as illustrated by FIGS. 15-17. Representatively, each of the bits of the larger key are used to create the smaller keys. Referring to FIG. 15, key reduction logic 320 includes a pair of logic gates to perform 128-bit AES key to 112-bit 3DES key reduction. As illustrated, final key 490 is split into a lower M-bits and an upper N-bits. In one embodiment, the lower M-bits are 112-bits and the upper N-bits are 16-bits, which are provided to logic gate 340. Representatively, logic gate 340 XORs upper N-bits across lower M-bits seven times to produce a 112-bit 3DES key.

FIG. 16 further illustrates key reduction logic 330, configured to perform key reduction to provide a 64-bit DVB CSA key. Representatively, content descrambling key 490 is divided into lower M-bits and upper N-bits, which are combined together using an XOR operation by logic gate 340 to form an M-bit DVB CSA key. As illustrated, the DVB CSA key is a 64-bit key value. In FIG. 17, key reduction logic 330 is configured to perform key reduction from an AES key 490 to a DES key. Representatively, initial key 490 is divided into lower M-bits and upper N-bits, which are combined by logic gate 340 to form an M-bit value. The M-bit value is then divided into a lower X-bits and an upper Y-bits. These values are then combined using an exclusive OR operation of the upper Y-bits across the lower X-bits seven times to provide a 56-bit DES key value.

Accordingly, ICB 400 is a solitary block which can be iteratively used to implement virtually any type of conditional access or digital write management scheme. Accordingly, ICB 400 can eliminate the need for separable security or crypto processors for stand alone conditional access or copy protection. Hence, using ICB 400 implemented with at least one OTP secret key, flexible key ladders may be managed by a set-top box's main CPU. While ICB 400 may be used to mate a smart card to a set-top box to make hacking more difficult, its true value is in stand alone security, which can greatly reduce cost of a set-top box by eliminating costly smart cards. Hence, ICB 400 provides service operators security options in a content delivery system at a reduced cost compared to conventional set-top box devices.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the embodiments to the full extent indicated by the broad general meaning of the terms in which the appended claims are expressed.

Having disclosed exemplary embodiments and the best mode, modifications and variations may be made to the disclosed embodiments while remaining within the scope of the embodiments of the invention as defined by the following claims.

What is claimed is:

1. An integrated circuit comprising:
   a first cryptographic block to iteratively descramble received information using one of an internal key and a preprogrammed key to form one of a descrambled key and a descrambled data;
   a key feedback path for storing of the descrambled key as the internal key and to provide the one of the internal key and the preprogrammed key to a key input of the first cryptographic block;
   a second cryptographic block to descramble received scrambled digital content using a final descrambling key from the first cryptographic block to form descrambled digital content, wherein the first cryptographic block is separate and different from the second cryptographic block;
   a data feedback path for storing of the descrambled data within a data register as internal data, wherein the data feedback path for descrambled data is separate and different from the key feedback path for the descrambled key, wherein the key feedback path and the data feedback path to operate according to an off-chip insecure CPU; and
   data selection logic coupled to the data register and an external information input, the data selection logic to provide one of the internal data from the data register and the received information from the external information input to a data input of the first cryptographic block.

2. The integrated circuit of claim 1, wherein the key feedback path further comprises:
   a preprogrammed key register to store at least the preprogrammed key; an internal key register to store at least the descrambled key; and
   key selection logic to provide the one of the preprogrammed key and the internal key to the key input of the first cryptographic block using controls accessible outside the integrated circuit and accessible by an insecure CPU.

3. The integrated circuit of claim 1, further comprising:
   gate enable logic coupled to the key feedback path of the first cryptographic block to receive the one of the internal key and the preprogrammed key; and
   a logic gate coupled to a data output of the first cryptographic block, the logic gate to compute a key hash value from the one of the internal key and the preprogrammed key received from the gate enable logic and the descrambled key received from the data output of the first cryptographic block when enabled by the gate enable logic.

4. The integrated circuit of claim 1, further comprising:
   gate enable logic coupled to the data input of the first cryptographic block to receive the received information; and
   a logic gate coupled to a data output of the first cryptographic block, the logic gate to compute a hash data value from the received information and the descrambled data from the data output of the first cryptographic block when enabled by the gate enable logic.

5. The integrated circuit of claim 1, further comprising:
   gate enable logic coupled to the data register; and
   a logic gate coupled to a data input of the first cryptographic block, the logic gate to form a permuted value from the received information and the descrambled data from the gate enable logic and to provide the permuted value to the data input of the first cryptographic block when enabled by the gate enable logic and to provide the received information to the data input of the first cryptographic block when disabled.

6. The integrated circuit of claim 1, further comprising:
gate enable logic to receive an internal data value;
a logic gate coupled to the key feedback path of the first cryptographic block and the gate enable logic, the logic gate to compute a permuted key value from the internal data value and the one of the internal key and the pre-programmed key when enabled by the gate enable logic and to provide the permuted key value to the key input of the first cryptographic block; and
an external data register coupled to a data output of the first cryptographic block to store descrambled data generated by the first cryptographic block with the permuted key value received as the key input of the first cryptographic block.

7. The integrated circuit of claim 6, wherein the internal value being one of a fixed value, a stored internal key, stored internal data, and a one-time-programmable value.

8. The integrated circuit of claim 1, wherein the first cryptographic block is an embedded cryptographic CPU programmed to iteratively descramble the received information using one of the internal key and the preprogrammed key to form one of the descrambled key and descrambled data.

9. The integrated circuit of claim 1, wherein the key feedback path and the data feedback path to operate according to an off-chip insecure CPU.

10. The integrated circuit of claim 1, wherein the first cryptographic block is to operate according to a state machine.

11. The integrated circuit of claim 1, further comprising:
gate enable logic to receive an internal data value;
a logic gate coupled to the key feedback path of the first cryptographic block and the gate enable logic, the logic gate to compute a permuted key value from the internal data value and the one of the internal key and the pre-programmed key when enabled by the gate enable logic and to provide the permuted key value to the key input of the first cryptographic block to generate a final key and to provide the final key as a key input of the second cryptographic block.

12. The integrated circuit of claim 11, wherein the internal value being one of a fixed value, a stored internal key, stored internal data, and a one-time-programmable value.

13. The integrated circuit of claim 1, further comprising:
a logic gate to receive the descrambling key from the first cryptographic block and an internal value, the logic gate to generate a permuted key value as a final key and provide the final key to a key input of the second cryptographic block.

14. The integrated circuit of claim 13, wherein the internal value being one of a fixed value, a stored internal key, stored internal data, and a one-time-programmable value.

15. The integrated circuit of claim 1, further comprising:
key reduction logic to receive the descrambled key from the first cryptographic block having a key size according to a first cryptographic protocol of the first cryptographic block, the key reduction logic to reduce the key size of the descrambled key to match a key size of a second cryptographic protocol of the second cryptographic block to form a final key whose value is a function of every bit of the descrambled key.

16. The integrated circuit of claim 15, wherein the first cryptographic protocol is an advanced encryption standard (AES) protocol and the second cryptographic protocol is one of a triple data encryption standard (3DES) protocol, a digital video broadcast (DVB) common scrambling algorithm (CSA) protocol and a data encryption standard (DES) protocol.

17. The integrated circuit of claim 15, wherein the first cryptographic protocol is a triple data encryption standard protocol (3DES) and the second cryptographic protocol is one of a digital video broadcast (DVB) common scrambling algorithm (CSA) and a data encryption standard (DES) algorithm.

18. The integrated circuit of claim 15, wherein the first cryptographic protocol is digital video broadcast (DVB) common scrambling algorithm (CSA) and the second cryptographic protocol is the data encryption standard (DES) algorithm.

19. The integrated circuit of claim 1, wherein the integrated circuit is a decoder integrated circuit to decompress the descrambled digital content.

20. The integrated circuit of claim 1, wherein the integrated circuit is a cryptographic integrated circuit.

21. The integrated circuit of claim 1, further comprising: a decoder to decode the descrambled digital content to form clear digital content.

22. The integrated circuit of claim 21, further comprising: a non-volatile memory to store the clear digital content in a scrambled format.

23. The integrated circuit of claim 1, wherein the preprogrammed key is a one-time programmable value that cannot be read or overwritten once programmed.

* * * * *